(12) United States Patent
Brandt et al.

(10) Patent No.: US 11,547,183 B2
(45) Date of Patent: Jan. 10, 2023

(54) BELT DEFLECTOR

(71) Applicant: JOYSON SAFETY SYSTEMS GERMANY GMBH, Aschaffenburg (DE)

(72) Inventors: Marc Brandt, Vienna (AT); Uwe Klaiber, Heidenheim (DE); Gerhard Frey, Steinheim (DE); Peter Linde, Ulm (DE); Joachim Nüsseler, Langenau (DE); Walter Birk, Gerestetten (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 304 days.

(21) Appl. No.: 16/765,151

(22) PCT Filed: Nov. 18, 2019

(86) PCT No.: PCT/DE2019/200133
§ 371 (c)(1),
(2) Date: May 18, 2020

(87) PCT Pub. No.: WO2020/108710
PCT Pub. Date: Jun. 4, 2020

(65) Prior Publication Data
US 2021/0212414 A1    Jul. 15, 2021

(30) Foreign Application Priority Data

Nov. 29, 2018  (DE) ..................... 10 2018 220 620.1

(51) Int. Cl.
*A44B 11/25*   (2006.01)
*B60R 22/18*   (2006.01)

(52) U.S. Cl.
CPC ....... *A44B 11/2553* (2013.01); *A44B 11/2561* (2013.01); *B60R 2022/1812* (2013.01)

(58) Field of Classification Search
CPC ............ A44B 11/2553; A44B 11/2561; B60R 2022/1812; B60R 22/1855; B60R 22/185
See application file for complete search history.

(56) References Cited

U.S. PATENT DOCUMENTS 4,682,791 A * 7/1987 Ernst ................... B60R 22/1855
                                                280/808
4,979,764 A * 12/1990 Drinane ............. A44B 11/2557
                                                280/808
(Continued)

FOREIGN PATENT DOCUMENTS

CN       101402346 A     4/2009
CN       205396007 U     7/2016
(Continued)

OTHER PUBLICATIONS

German Examination Report dated Aug. 19, 2019 issued in related German Patent Application No. 10 2018 220 620.1 filed Nov. 29, 2018.
(Continued)

*Primary Examiner* — Robert Sandy
*Assistant Examiner* — Louis A Mercado
(74) *Attorney, Agent, or Firm* — Gordon Rees Scully Mansukhani, LLP

(57) ABSTRACT

A belt deflector having a main element which is fastenable to a vehicle structure, and a belt contact element which is movable in relation to the main element and forms a belt contact face or belt contact edge for a seat belt that is to be deflected. The belt deflector has a deformable intermediate element which, during movement of the belt contact element relative to the main element in the direction of the intermediate element, is deformed and is pressed against the seat (Continued)

Figure 2:
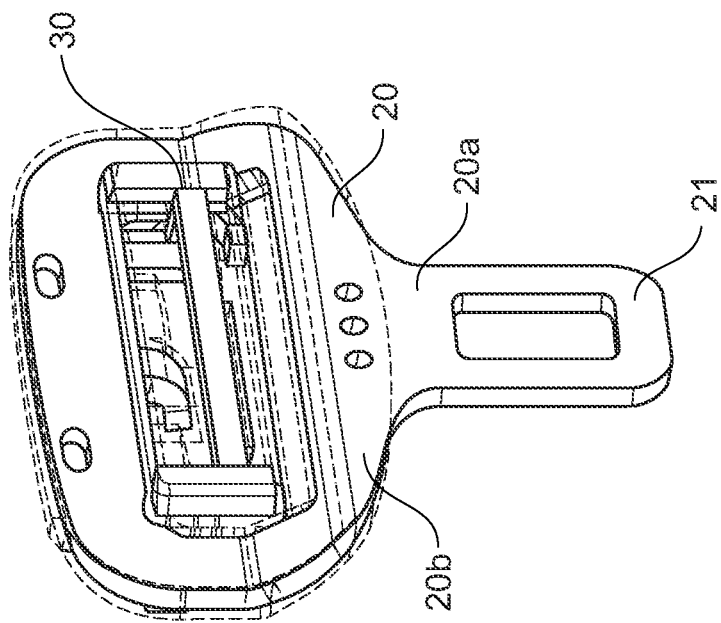

belt. The belt contact element forms a mating clamping face, and a belt strap portion of the seat belt is arranged between the intermediate element and the mating clamping face. During the relative movement, the intermediate element presses the belt strap portion onto the mating clamping face.

12 Claims, 4 Drawing Sheets

(56) References Cited

U.S. PATENT DOCUMENTS

| | | | | |
|---|---|---|---|---|
| 5,058,244 | A * | 10/1991 | Fernandez | A44B 11/2557 297/483 |
| 5,100,176 | A * | 3/1992 | Ball | A44B 11/2557 280/801.1 |
| 5,383,713 | A * | 1/1995 | Kamiyama | B60R 21/18 297/483 |
| 5,417,455 | A * | 5/1995 | Drinane | B60R 22/30 280/808 |
| 5,806,148 | A * | 9/1998 | McFalls | A44B 11/2561 24/171 |
| 5,870,816 | A * | 2/1999 | McFalls | B60R 22/30 29/434 |
| 8,474,106 | B2 | 7/2013 | Richter et al. | |
| 8,793,844 | B2 | 8/2014 | Mcfalls et al. | |
| 10,934,644 | B2 | 3/2021 | Taninaka et al. | |
| 2009/0085341 | A1 | 4/2009 | Suyama et al. | |

FOREIGN PATENT DOCUMENTS

| | | |
|---|---|---|
| DE | 10 2004 023 394 B4 | 11/2006 |
| DE | 10 2014 106 097 A1 | 11/2015 |
| DE | 10 2014 109 740 A1 | 1/2016 |
| DE | 10 2016 205 068 A1 | 6/2016 |
| EP | 1 983 857 B1 | 7/2009 |
| JP | 2015-20580 | 2/2015 |
| WO | 2006/092206 A1 | 9/2006 |
| WO | 2007/090551 A1 | 8/2007 |
| WO | 2015/025801 A1 | 2/2015 |
| WO | 2016/087019 A1 | 6/2016 |

OTHER PUBLICATIONS

International Search Report dated Feb. 19, 2020 issued in related International Application No. PCT/DE2019/200133; filed Nov. 18, 2019.

Chinese Office Action dated Jun. 6, 2022 issued by the Chinese Patent Office in related Chinese Patent Application No. 201980006362.2.

* cited by examiner

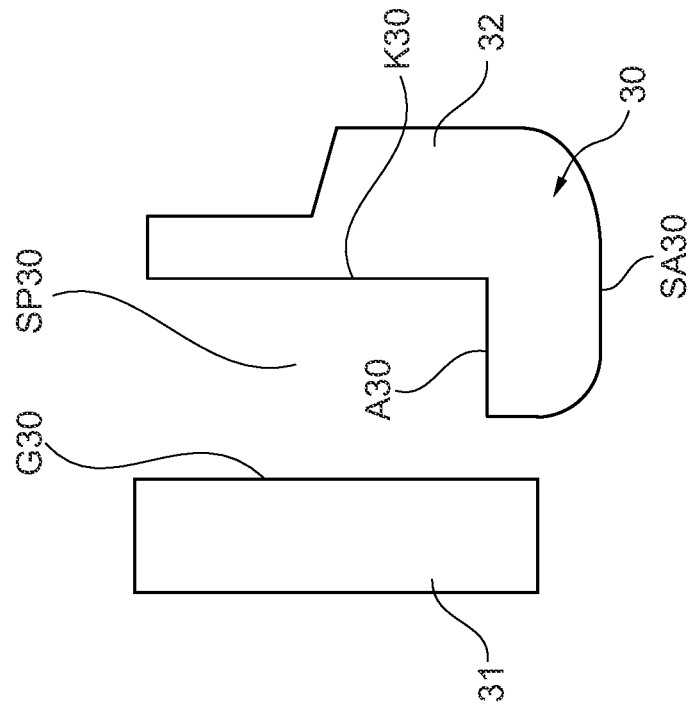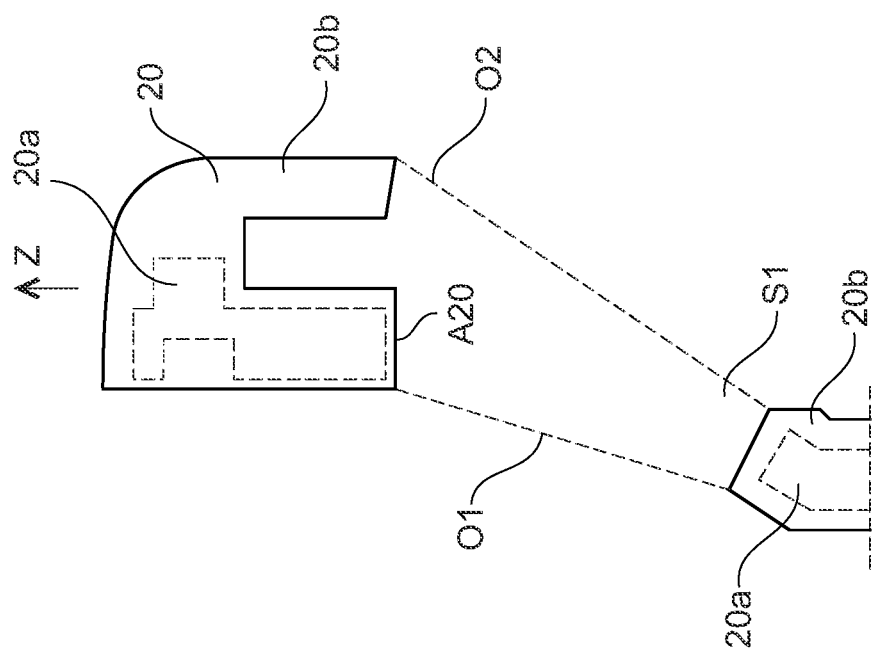

BELT DEFLECTOR

The invention relates to a belt deflector, for example of the kind known from the German laid-open specification DE 10 2016 205 068 A1. The previously disclosed belt deflector is equipped with a main element which is fastenable to a vehicle structure, and with a belt contact element which is movable in relation to the main element and forms a belt contact face or belt contact edge for a seat belt that is to be deflected. The belt deflector has a deformable intermediate element which, during a relative movement of the movable belt contact element relative to the main element in the direction of the intermediate element, is deformed and is pressed against the seat belt by this deformation.

The object of the invention is to further optimize a belt deflector of this kind, in particular with a view to achieving the smallest possible dimensions and the lowest possible weight.

This object is achieved, according to the invention, by a belt deflector having the features of claim 1. Advantageous embodiments of the belt deflector according to the invention are set forth in dependent claims.

According to the invention, provision is thus made that the belt contact element forms a mating clamping face, and a belt strap portion of the seat belt is arranged between the intermediate element and the mating clamping face, and, during said relative movement, the intermediate element presses the belt strap portion onto the mating clamping face.

A substantial advantage of the belt deflector according to the invention can be seen in the fact that the seat belt is clamped between the intermediate element and the movable belt contact element and not, as in the previously disclosed belt deflector mentioned above, between the intermediate element and the main element. By virtue of this modification of the clamping region, the width of the belt deflector can be reduced by quite a few millimeters and a weight reduction of over 10% can be achieved.

The belt contact element preferably has a first portion, which forms the mating clamping face, and a second portion, which forms a clamping face lying opposite the mating clamping face.

The intermediate element and the belt strap portion are preferably arranged between the clamping face and the mating clamping face, wherein, during said relative movement in the event of a tensile force acting on the seat belt, the intermediate element and the belt strap portion are clamped between the clamping face and the mating clamping face of the belt contact element.

The mating clamping face and the clamping face preferably form a gap at the belt contact element side. The intermediate element and the belt strap portion are preferably arranged in the gap at the belt contact element side.

It is also advantageous if the intermediate element is arranged, in particular clamped, between a contact face of the main element and a contact face of the belt contact element, wherein the respective distance between the two contact faces determines the deformation state of the intermediate element.

The contact face of the belt contact element is preferably arranged in the second portion of the belt contact element.

In a particularly preferred embodiment variant, provision is made that the belt deflector has a first slot, through which the seat belt is guided, wherein the first slot is formed in the main element, and the second portion of the movable belt contact element is arranged in the region of the first slot and is displaceable there, and the belt deflector has a second slot, through which the seat belt is guided, wherein the second slot is delimited by the first portion of the belt contact element, forming the mating clamping face, and by the intermediate element, and wherein, in the event of a tensile force acting on the seat belt and of a resulting movement of the belt contact element, the slot width of the first slot becomes greater and the slot width of the second slot becomes smaller.

The belt deflector preferably has a plug-in portion which is suitable for plugging into a belt buckle and starting from which, seen in the direction of the seat belt, the first slot, seen in the pulling direction of the seat belt, begins in front of the second slot.

The belt deflector is preferably a plug-in tongue for a belt buckle of a seat belt system. The plug-in tongue preferably has a plug-in portion which is suitable for plugging into the belt buckle and starting from which, seen in the direction of the seat belt, the first slot begins in front of the second slot, or the near slot edge of the first slot lies in front of the near slot edge of the second slot.

It is advantageous in particular if the second slot, seen in the transverse direction (with respect to the longitudinal direction of the plug-in portion), lies in the region of the first slot or the first and second slots, seen in the transverse direction, at least overlap each other.

It is also advantageous if the surface normal on the mating clamping face is oriented perpendicular to the pulling direction of the seat belt, or the angle between this surface normal and the pulling direction is between 80 and 110 degrees.

The plug-in portion of the belt deflector is preferably arranged parallel to the mating clamping face and parallel to the clamping face.

As regards the slot arrangement, it is considered advantageous if the first portion of the belt contact element is arranged at least for the most part outside the first slot.

The opening area of the first slot, directed toward the first portion of the belt contact element, preferably has an angle to the mating clamping face of between 10 and 45 degrees.

The contact face arranged in the second portion of the belt contact element and the clamping face arranged in the second portion of the belt contact element are preferably arranged perpendicular to each other or at least with an error angle to the perpendicular of less than 10 degrees.

The contact face arranged in the second portion of the belt contact element and the contact face arranged in the main element are preferably arranged parallel to each other or at least with an error angle of less than 10 degrees.

The clamping face arranged in the second portion of the belt contact element and the mating clamping face arranged in the first portion of the belt contact element are preferably arranged parallel to each other or at least with an error angle of less than 10 degrees.

The movable belt contact element is preferably held by the main element so as to be linearly displaceable along a predefined sliding direction, wherein the sliding direction corresponds to the direction of the force exerted on the belt deflector by the seat belt.

The displaceable mounting of the belt contact element in or on the main element can be based, for example, on two parallel guide grooves or guide rails which are formed in the main element and in which matching form-fit engagement elements of the belt contact element are guided. For example, the mounting can be provided in the same way as in the belt deflector described in the document DE 10 2016 205 068 A1.

The main element preferably comprises a metal core which is coated in sections with plastic or is embedded therein. That edge of the first slot delimited by the main element is preferably formed by a portion of the main element that is coated with plastic or is embedded therein.

The intermediate element is preferably elastically and/or plastically deformable. With regard to a restoring force by the intermediate element, it is advantageous if the latter is made of elastic material. The intermediate element is preferably composed of at least one or more of the following materials or at least also has one or more of the following materials: styrene, butadiene; styrene acrylate, pure acrylate, vinyl acetate, styrene-butadiene rubber, chloroprene rubber, butadiene rubber (BR), acrylonitrile-butadiene rubber (NBR), butyl rubber (IIR), ethylene-propylene-diene rubber (EPDM), chloroprene rubber (CR), polyisoprene rubber (IR), rubber and/or PUR.

Figure 1:
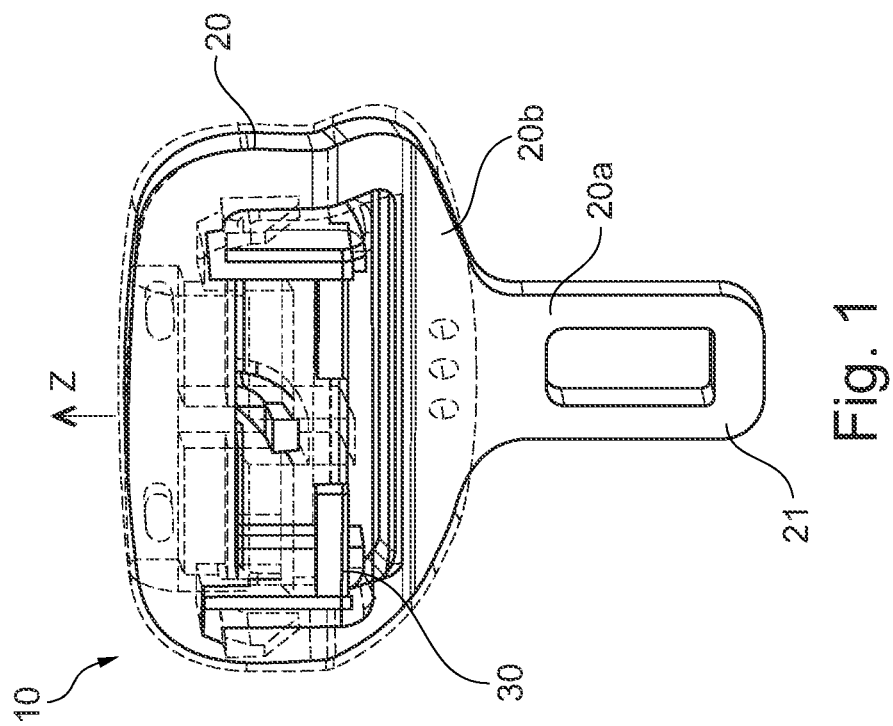
Figure 6:
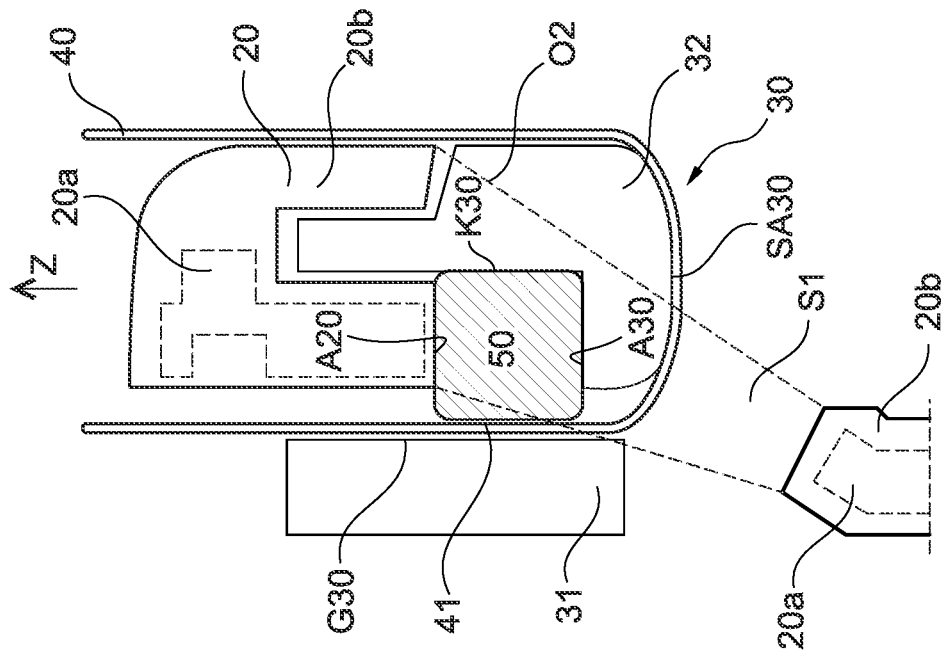
Figure 5:
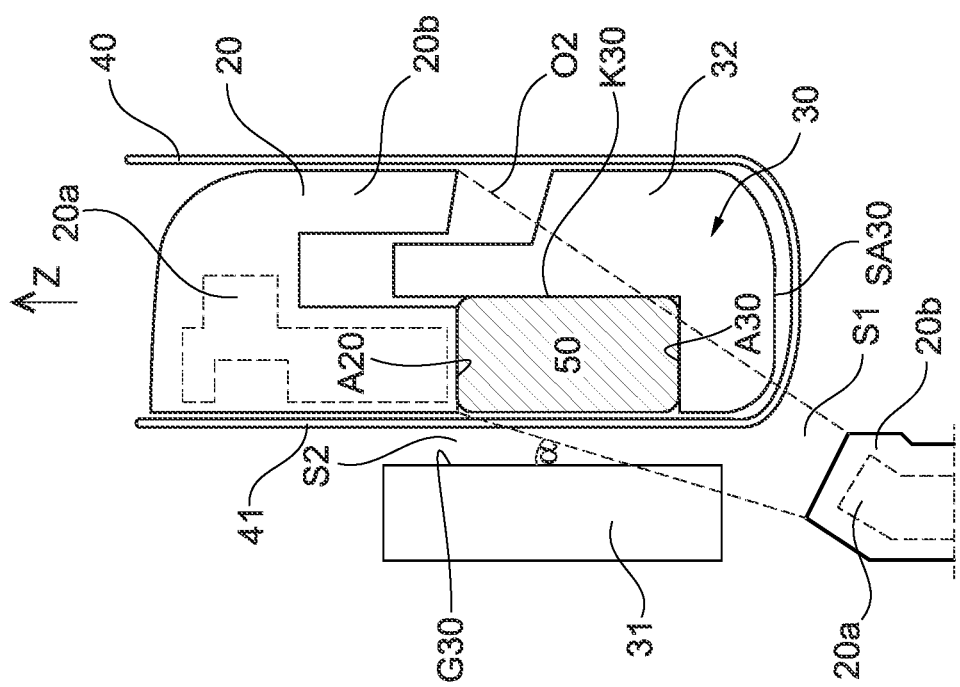
Figure 7:
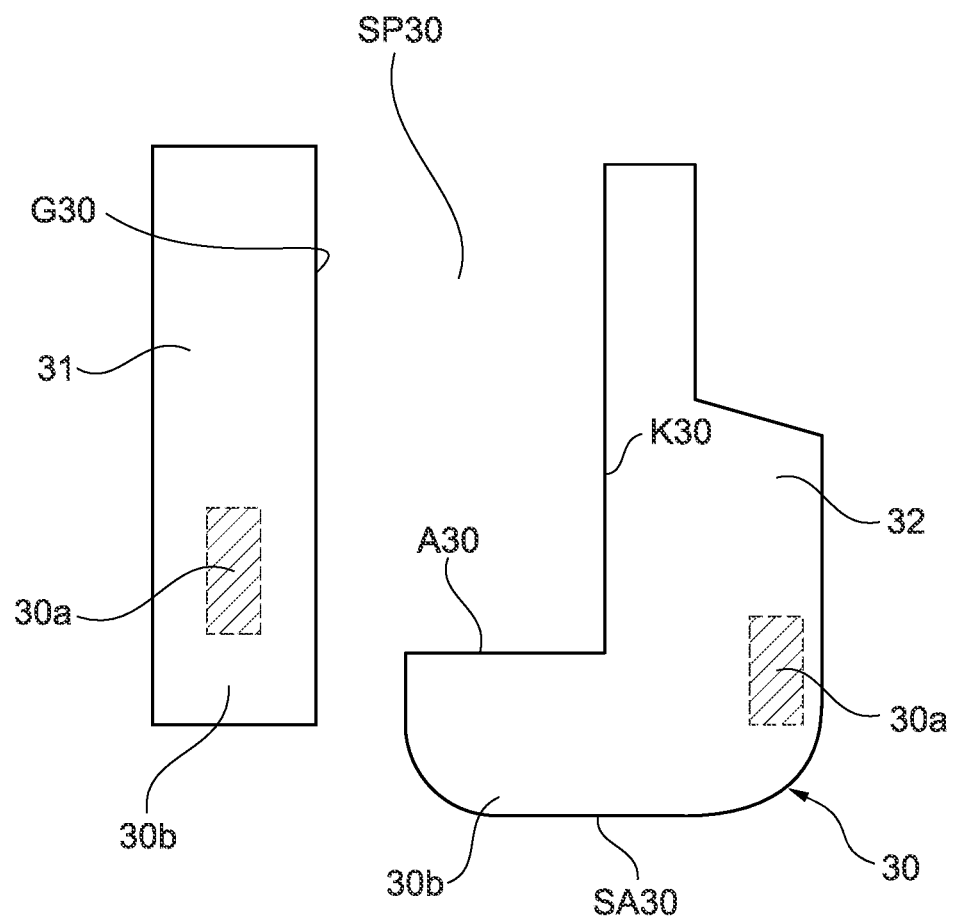

The invention is explained in more detail below on the basis of illustrative embodiments; by way of example here FIG. 1 shows a three-dimensional view of the front face of an illustrative embodiment of a belt deflector according to the invention, FIG. 2 shows a three-dimensional view of the rear face of the illustrative embodiment according to FIG. 1, FIG. 3 shows, in a cross section, a portion of a main element of the belt deflector according to FIGS. 1 and 2, FIG. 4 shows, in a cross section, a portion of a first illustrative embodiment of a belt contact element of the belt deflector according to FIGS. 1 and 2, FIG. 5 shows, in a cross section, the portion of the main element according to FIG. 3 and the portion of the belt contact element according to FIG. 4 in an assembled state with an intermediate element arranged between them, wherein FIG. 5 shows a starting state of the belt deflector in which the latter is free of tensioning and free of force, FIG. 6 shows the portion of the belt deflector, shown in FIG. 4, in the event of a tensile force through a seat belt and of a resulting relative movement of the belt contact element relative to the main element of the belt deflector, and FIG. 7 shows, in a cross section, a portion of a second illustrative embodiment of a belt contact element of the belt deflector according to FIGS. 1 and 2.

For the sake of clarity, the same reference signs are always used for identical or comparable components in the figures.

FIG. 1 shows, in a three dimensional view obliquely from the side, an illustrative embodiment of a belt deflector in the form of a plug-in tongue for a belt buckle (not shown in detail) of a safety belt system. The belt deflector 10 has a main element 20 whose lower portion, in FIG. 1, forms a plug-in portion 21 of the belt deflector 10. The main element 20 is formed by a metal core 20a which is coated in sections with plastic 20b or is embedded therein.

The belt deflector 10 additionally comprises a belt contact element 30 which is movable relative to the main element 20 along a pulling or sliding direction Z. The belt contact element 30 is preferably made of plastic.

The displaceable mounting of the belt contact element 30 in or on the main element 20 can be based, for example, on two parallel guide grooves or guide rails which are formed in the main element and in which matching form-fit engagement elements of the belt contact element 30 are guided. For example, the mounting can be provided in the same way as in the belt deflector described in the document DE 10 2016 205 068 A1.

An elastically deformable intermediate element arranged between the belt contact element 30 and the main element 20 is not shown in FIG. 1.

FIG. 2 shows the rear face of the belt deflector 10 in a three-dimensional view obliquely from the side.

FIG. 3 shows, in cross section, a portion of the main element 20 of the belt deflector 10 according to FIGS. 1 and 2. It will be seen that a first slot S1 of the belt deflector 10 is formed in the main element 20 and is defined or delimited by a first opening area O1, shown on the left in FIG. 3, and by a second opening area O2, shown on the right in FIG. 3. As will be explained in more detail below, a seat belt can be guided through the first slot S1 of the belt deflector 10.

In FIG. 3, the metal core of the main element 20 is designated by reference sign 20a, and the plastic that surrounds the metal core in sections is designated by reference sign 20b.

FIG. 4 shows the belt contact element 30 according to FIGS. 1 and 2 in more detail in cross section. It will be seen that the belt contact element 30 has a first portion 31 and a second portion 32. The belt contact element 30 according to FIG. 4 is composed of a single material, preferably plastic.

As will be explained in detail in connection with FIGS. 5 and 6, the first portion 31 of the belt contact element 30 is situated wholly or at least for the most part outside the first slot S1 of the main element 20, specifically on the side directed toward the first opening area O1 of the first slot S1.

The first portion 31 forms a mating clamping face G30 of the belt contact element 30, which mating clamping face G30 lies opposite a clamping face K30 of the belt contact element 30. The clamping face K30 is formed by the second portion 32 of the belt contact element 30.

A gap SP30 at the belt contact element side is formed between the mating clamping face G30 and the clamping face K30, in which gap the aforementioned deformable intermediate element is arranged and through which the seat belt is guided.

In FIG. 5, the portion of the main element 20 depicted in FIG. 3 and the portion of the main contact element 30 depicted in FIG. 4 are shown in the assembled state. FIG. 5 also shows a seat belt 40 which is guided through the first slot S1 in the main element 20 and bears on a belt contact face SA30 of the belt contact element 30. A belt strap portion 41 of the seat belt 40 is located, together with a deformable intermediate element 50, in the gap SP30 at the side of the belt contact element 30.

The intermediate element 50 is clamped between a contact face A20 of the main element 20 and a contact face A30 of the belt contact element 30. The deformation state of the intermediate element 50 is determined by the respective distance between the two contact faces A20 and A30. The intermediate element 50 is preferably composed of at least one or more of the following materials or at least also has one or more of the following materials: styrene, butadiene; styrene acrylate, pure acrylate, vinyl acetate, styrene-butadiene rubber, chloroprene rubber, butadiene rubber (BR), acrylonitrile-butadiene rubber (NBR), butyl rubber (IIR), ethylene-propylene-diene rubber (EPDM), chloroprene rubber (CR), polyisoprene rubber (IR), rubber and/or PUR.

FIG. 5 shows the starting state of the belt deflector 10, in which state the seat belt 40 does not exert any tensile force along the pulling direction Z. The second slot S2 of the belt deflector 10, formed between the intermediate element 50 and the mating clamping face G30, thus has its maximum slot width, in which the belt strap portion 41 can pass unclamped through the second slot S2.

As regards the arrangement of the mating clamping face G30 and of the opening area O1 of the first slot S1, it is considered advantageous if the angle α between the opening area O1 and the mating clamping face G30 is in a range of between 10° and 45°.

FIG. 6 shows the belt deflector 10 according to FIG. 5 in the event of a tensile force being exerted on the belt contact element 30 by the seat belt 40 along the pulling direction Z. By means of the tensile force, the belt contact element 30 is displaced along the pulling direction Z or pulled upward, and the distance between the two contact faces A20 and A30 is reduced. The pulling direction Z thus corresponds to the sliding direction along which the belt contact element 30 is displaced relative to the main element 20.

The reduction of the distance between the contact faces A20 and A30 leads to a deformation of the intermediate element 50, as a result of which the latter is pressed in the direction of the belt strap portion 41 and therefore in the direction of the mating clamping face G30. The intermediate element 50 bears here on the clamping face K30 in the second portion 32 of the belt contact element 30.

Through the deformation of the intermediate element 50, the slot width of the first slot S1 becomes greater and the slot width of the second slot S2 becomes smaller, as a result of which the belt strap portion 41 is clamped in the second slot S2 and the seat belt 40 as a whole is held or locked by friction.

As regards the arrangement of the contact face A30 and of the clamping face K30, it is considered advantageous if the contact face A30 arranged in the second portion 32 of the belt contact element 30 and the clamping face K30 arranged in the second portion 32 of the belt contact element 30 are arranged perpendicular to each other or at least with an error angle to the perpendicular of less than 10 degrees.

The contact face A30 arranged in the second portion 32 of the belt contact element 30 and the contact face A20 arranged in the main element 20 are preferably arranged parallel to each other or at least with an error angle of less than 10 degrees to each other.

The clamping face K30 arranged in the second portion 32 of the belt contact element 30 and the mating clamping face G30 arranged in the first portion 31 of the belt contact element 30 are preferably arranged parallel to each other or at least with an error angle of less than 10 degrees to each other.

FIG. 7 shows, in cross section, a further illustrative embodiment of the belt contact element 30 according to FIGS. 1 and 2. In terms of its form and function, the belt contact element 30 according to FIG. 7 corresponds to the belt contact element 30 according to FIGS. 4 to 6, and therefore reference is made in this connection to the above observations, which apply accordingly here. Only the materials of the belt contact element 30 are different than in the belt contact element 30 according to FIGS. 4 to 6.

In the illustrative embodiment according to FIG. 7, the belt contact element 30 has two materials, namely a metal core 30a, which is embedded in plastic 30b. Such an embodiment permits great stability with low weight.

Although the invention has been illustrated and described more specifically in detail by preferred illustrative embodiments, the invention is not restricted by the disclosed examples, and other variations can be derived therefrom by a person skilled in the art, without departing from the scope of protection of the invention.

LIST OF REFERENCE SIGNS 10 belt deflector
20 main element
20a metal core
20b plastic
21 plug-in portion
30 belt contact element
30a metal core
30b plastic
31 portion
32 portion
40 seat belt
41 belt strap portion
50 intermediate element
A20 contact face
A30 contact face
G30 mating clamping face
K30 clamping face
O1 opening area
O2 opening area
SA30 belt contact face
SP30 gap
S1 slot
S2 slot
Z pulling direction or sliding direction
α angle

The invention claimed is:

1. A belt deflector (10) having
a main element (20) which is fastenable to a vehicle structure, and
a belt contact element (30) which is movable in relation to the main element (20) and forms a belt contact face (SA30) or belt contact edge for a seat belt (40) that is to be deflected,
wherein the belt deflector (10) has a deformable intermediate element (50) which, during a relative movement of the belt contact element (30) relative to the main element (20) in a direction of the intermediate element (50), is deformed and is pressed against the seat belt (40) by this deformation,
wherein
the belt contact element (30) forms a mating clamping face (G30), and
a belt strap portion (41) of the seat belt (40) is arranged between the intermediate element (50) and the mating clamping face (G30), and, during said relative movement, the intermediate element (50) presses the belt strap portion (41) onto the mating clamping face (G30);
the belt contact element (30) has a first portion (31), which forms the mating clamping face (G30), and a second portion (32), which forms a clamping face (K30) lying opposite the mating clamping face (G30);
the intermediate element (50) and the belt strap portion (41) are arranged between the clamping face (K30) and the mating clamping face (G30), wherein, during said relative movement in an event of a tensile force acting on the seat belt (40), the intermediate element (50) and the belt strap portion (41) are clamped between the clamping face (K30) and the mating clamping face (G30) of the belt contact element (30); and
wherein the first portion (31) of the belt contact element (30) is arranged at least for a most part outside a first slot (S1), and
an opening area of the first slot (S1), directed toward the first portion (31) of the belt contact element (30), has an angle (α) to the mating clamping face (G30) of between 10 and 45 degrees.

2. The belt deflector (10) as claimed in claim 1, wherein the mating clamping face (G30) and the clamping face (K30) form a gap (SP30) at the belt contact element, and the intermediate element (50) and the belt strap portion (41) are arranged in the gap (SP30) at the belt contact element.

3. The belt deflector (10) as claimed in claim 1, wherein the intermediate element (50) is arranged, in particular clamped, between a contact face (A20) of the main element (20) and a contact face (A30) of the belt contact element (30), wherein a respective distance between the two contact faces (A20, A30) determines a deformation state of the intermediate element (50).

4. The belt deflector (10) as claimed in claim 3, wherein the contact face (A30) of the belt contact element (30) is arranged in the second portion (32) of the belt contact element (30).

5. The belt deflector (10) as claimed in claim 1, wherein the seat belt (40) is guided through the first slot (S1), wherein the first slot (S1) is formed in the main element (20), and the second portion (32) of the belt contact element (30) is arranged in a region of the first slot (S1) and is displaceable there, and the belt deflector (10) has a second slot (S2), through which the seat belt (40) is guided, wherein the second slot (S2) is delimited by the first portion (31) of the belt contact element (30), forming the mating clamping face (G30), and by the intermediate element (50), and wherein, in the event of the tensile force acting on the seat belt (40) and of a resulting movement of the belt contact element (30), a slot width of the first slot (S1) becomes greater and the slot width of the second slot (S2) becomes smaller.

6. The belt deflector (10) as claimed in claim 5, wherein the belt deflector (10) has a plug-in portion (21) which is suitable for plugging into a belt buckle and starting from which, seen in a direction of the seat belt (40), the first slot (S1), seen in a pulling direction (Z) of the seat belt (40), begins in front of the second slot (S2).

7. The belt deflector (10) as claimed in claim 5, wherein the belt deflector (10) is a plug-in tongue for a belt buckle of a seat belt system, and the plug-in tongue has a plug-in portion (21) which is suitable for plugging into the belt buckle and starting from which, in a direction of the seat belt (40), the first slot (S1) begins in front of the second slot (S2), or a near slot edge of the first slot (S1) lies in front of a near slot edge of the second slot (S2).

8. The belt deflector (10) as claimed in claim 6, wherein the second slot (S2), seen in a transverse direction with respect to a longitudinal direction of the plug-in portion (21), lies in the region of the first slot (S1) or the first and second slots (S1, S2), seen in the transverse direction, at least overlap each other.

9. The belt deflector (10) as claimed in claim 6, characterized in that the plug-in portion (21) of the belt deflector (10) is arranged parallel to the mating clamping face (G30) and parallel to the clamping face (K30).

10. The belt deflector (10) as claimed in claim 1, wherein a surface normal on the mating clamping face (G30) is oriented perpendicular to a pulling direction (Z) of the seat belt (40), or an angle between the surface normal and the pulling direction (Z) is between 80 and 110 degrees.

11. The belt deflector (10) as claimed in claim 1, wherein a contact face (A30) arranged in the second portion (32) of the belt contact element (30) and the clamping face (K30) arranged in the second portion (32) of the belt contact element (30) are arranged perpendicular to each other or at least with an error angle to the perpendicular of less than 10 degrees, and/or the contact face (A30) arranged in the second portion (32) of the belt contact element (30) and a contact face (A20) arranged in the main element (20) are arranged parallel to each other or at least with an error angle of less than 10 degrees, and/or the clamping face (K30) arranged in the second portion (32) of the belt contact element (30) and the mating clamping face (G30) arranged in the first portion (31) of the belt contact element (30) are arranged parallel to each other or at least with an error angle of less than 10 degrees.

12. The belt deflector (10) as claimed in claim 1, wherein the belt contact element (30) is held by the main element (20) so as to be linearly displaceable along a predefined sliding direction (Z), wherein the sliding direction (Z) corresponds to a direction of a force exerted on the belt deflector (10) by the seat belt (40).

* * * * *